US008705555B2

(12) United States Patent
Imai et al.

(10) Patent No.: US 8,705,555 B2
(45) Date of Patent: Apr. 22, 2014

(54) ROUTE CONTROL METHOD AND ROUTE CONTROL SYSTEM

(75) Inventors: Satoshi Imai, Kawasaki (JP); Akiko Yamada, Kawasaki (JP); Takanori Matsunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/890,776

(22) Filed: Sep. 27, 2010

(65) Prior Publication Data

US 2011/0075583 A1 Mar. 31, 2011

(30) Foreign Application Priority Data

Sep. 30, 2009 (JP) ................................. 2009-228956

(51) Int. Cl.
*H04Q 11/02* (2006.01)
(52) U.S. Cl.
USPC ........................................................ 370/430
(58) Field of Classification Search
USPC .................. 370/229–240, 351–430; 379/111, 379/114.01, 114.02; 455/403, 422.1, 445
See application file for complete search history.

(56) References Cited

U.S. PATENT DOCUMENTS

| 8,149,715 B1 * | 4/2012 | Goel et al. ..................... 370/238 |
| 2003/0161268 A1 | 8/2003 | Larsson et al. | |
| 2005/0249121 A1 | 11/2005 | Matsunaga | |
| 2005/0249215 A1 * | 11/2005 | Kelsey et al. .................. 370/392 |
| 2005/0286466 A1 * | 12/2005 | Tagg et al. ..................... 370/329 |

FOREIGN PATENT DOCUMENTS

| JP | 11-225159 | 8/1999 |
| JP | 2003-338832 | 11/2003 |
| JP | 2005-518717 | 6/2005 |
| JP | 2007-184969 | 7/2007 |

OTHER PUBLICATIONS

Japanese Office Action issued May 14, 2013 in corresponding Japanese Application No. 2009-228956.
Shinichi Furusho et al., "Mobility Based Algorithm for Mobile Ad Hoc Network", The Special Interest Group Technical Reports of Information Processing Society of Japan, Mobile Computing and Wireless Communication, vol. 2003, No. 21, Mar. 6, 2003, pp. 13-19.

* cited by examiner

*Primary Examiner* — Fan Ng
(74) *Attorney, Agent, or Firm* — Staas & Halsey LLP

(57) ABSTRACT

A route control system includes a status measuring unit, a cost management unit, a route determining unit, and a route setting unit. The status measuring unit checks a status of each node included in a network. The status is a wake state or a sleep state. The cost management unit updates a link cost for a link connected to a node in the wake state to a value smaller than any link cost for a link connected to a node in the sleep state. The route determining unit determines an optimum route connecting a first terminal to a second terminal. A sum of the link costs for the optimum route is lowest among the link costs for other available routes connecting the first terminal to the second terminal. The route setting unit sets a requested data flow in the optimum route.

6 Claims, 24 Drawing Sheets

FIG. 3

| NODE ATTRIBUTE TABLE | node1 | node2 | node3 | node4 | ... | nodeN |
|---|---|---|---|---|---|---|
| 31 — POWER CONSUMPTION (kW) | 10 | 10 | 20 | 15 | ... | 10 |
| 32 — NODE UTILIZATION STATUS (0/1) | 1 | 1 | 1 | 0 | ... | 0 |

FIG. 4

| LINK ATTRIBUTE TABLE | link1 | link2 | link3 | ... | linkM |
|---|---|---|---|---|---|
| 41 — FLOW-IN DESTINATION NODE | node3 | node2 | node4 | ... | nodeN |
| 42 — POWER CONSUMPTION (kW) | 0.1 | 0.1 | 0.1 | ... | 0.1 |
| 43 — TRAFFIC AMOUNT (Gbps) | 7 | 4 | 0 | ... | 2 |
| 44 — LINK UPPER LIMIT CONSTRAINT / PHYSICAL BAND (Gbps) | 8/10 | 8/10 | 8/10 | ... | 8/10 |
| 45 — RESIDUAL CAPACITY (Gbps) | 1 (=8−7) | 4 (=8−4) | 8 (=8−0) | ... | 6 (=8−2) |
| 46 — LINK UTILIZATION STATUS (0/1) | 1 | 1 | 0 | ... | 1 |
| 47 — LINK COST | δ (VERY SMALL) | δ | 15 | ... | δ |

FIG. 10

| NODE ATTRIBUTE TABLE | node1 | node2 | node3 | node4 | node5 | node6 | node7 | node8 | node9 | node10 |
|---|---|---|---|---|---|---|---|---|---|---|
| POWER CONSUMPTION | 10 | 10 | 20 | 15 | 20 | 30 | 10 | 20 | 10 | 10 |
| NODE UTILIZATION STATUS | 0 | 0 | 0 | 0 | 0 | 0 | 0 | 0 | 0 | 0 |

| LINK ATTRIBUTE TABLE | link1 | link2 | link3 | link4 | ... | link31 | link32 | link33 | link34 |
|---|---|---|---|---|---|---|---|---|---|
| FLOW-IN DESTINATION NODE | node1 | baseA | node2 | node1 | ... | node8 | node10 | node10 | baseD |
| POWER CONSUMPTION | 0.1 | 0.1 | 0.1 | 0.1 | ... | 0.1 | 0.1 | 0.1 | 0.1 |
| TRAFFIC AMOUNT | 0 | 0 | 0 | 0 | ... | 0 | 0 | 0 | 0 |
| UPPER LIMIT CONSTRAINT / PHYSICAL BAND | 8/10 | 8/10 | 8/10 | 8/10 | ... | 8/10 | 8/10 | 8/10 | 8/10 |
| RESIDUAL CAPACITY | 8 | 8 | 8 | 8 | ... | 8 | 8 | 8 | 8 |
| LINK UTILIZATION STATUS | 0 | 0 | 0 | 0 | ... | 0 | 0 | 0 | 0 |
| LINK COST | 10 | — | 10 | 10 | ... | 20 | 10 | 10 | — |

FIG. 13

| NODE ATTRIBUTE TABLE | node1 | node2 | node3 | node4 | node5 | node6 | node7 | node8 | node9 | node10 |
|---|---|---|---|---|---|---|---|---|---|---|
| POWER CONSUMPTION | 10 | 10 | 20 | 15 | 20 | 30 | 10 | 20 | 10 | 10 |
| NODE UTILIZATION STATUS | 1 | 0 | 1 | 0 | 1 | 0 | 1 | 0 | 1 | 0 |

| LINK ATTRIBUTE TABLE | link1 | link2 | link3 | link4 | ... | link31 | link32 | link33 | link34 |
|---|---|---|---|---|---|---|---|---|---|
| FLOW-IN DESTINATION NODE | node1 | baseA | node2 | node1 | ... | node8 | node10 | node10 | baseD |
| POWER CONSUMPTION | 0.1 | 0.1 | 0.1 | 0.1 | ... | 0.1 | 0.1 | 0.1 | 0.1 |
| TRAFFIC AMOUNT | 1 | 0 | 0 | 0 | ... | 0 | 0 | 0 | 0 |
| UPPER LIMIT CONSTRAINT / PHYSICAL BAND | 8/10 | 8/10 | 8/10 | 8/10 | ... | 8/10 | 8/10 | 8/10 | 8/10 |
| RESIDUAL CAPACITY | 7 | 8 | 8 | 8 | ... | 8 | 8 | 8 | 8 |
| LINK UTILIZATION STATUS | 0 | 0 | 0 | 0 | ... | 0 | 0 | 0 | 0 |
| LINK COST | δ | − | 10 | δ | ... | 20 | 10 | 10 | − |

FIG. 18

| NODE ATTRIBUTE TABLE | node1 | node2 | node3 | node4 | node5 | node6 | node7 | node8 | node9 | node10 |
|---|---|---|---|---|---|---|---|---|---|---|
| POWER CONSUMPTION | 10 | 10 | 20 | 15 | 20 | 30 | 10 | 20 | 10 | 10 |
| NODE UTILIZATION STATUS | 1 | 1 | 1 | 0 | 1 | 0 | 1 | 0 | 1 | 1 |

| LINK ATTRIBUTE TABLE | link1 | link2 | link3 | link4 | ... | link31 | link32 | link33 | link34 |
|---|---|---|---|---|---|---|---|---|---|
| FLOW-IN DESTINATION NODE | node1 | baseA | node2 | node1 | ... | node8 | node10 | node10 | baseD |
| POWER CONSUMPTION | 0.1 | 0.1 | 0.1 | 0.1 | ... | 0.1 | 0.1 | 0.1 | 0.1 |
| TRAFFIC AMOUNT | 1 | 0 | 0 | 2 | ... | 0 | 0 | 0 | 2 |
| UPPER LIMIT CONSTRAINT / PHYSICAL BAND | 8/10 | 8/10 | 8/10 | 8/10 | ... | 8/10 | 8/10 | 8/10 | 8/10 |
| RESIDUAL CAPACITY | 7 | 8 | 8 | 6 | ... | 8 | 8 | 8 | 6 |
| LINK UTILIZATION STATUS | 1 | 0 | 0 | 1 | ... | 1 | 0 | 0 | 1 |
| LINK COST | $\delta$ | - | $\delta$ | $\delta$ | ... | 20 | $\delta$ | $\delta$ | - |

ROUTE CONTROL METHOD AND ROUTE CONTROL SYSTEM

CROSS-REFERENCE TO RELATED APPLICATION

This application is based upon and claims the benefit of priority of the prior Japanese Patent Application No. 2009-228956, filed on Sep. 30, 2009, the entire contents of which are incorporated herein by reference.

FIELD

Embodiments discussed herein are related to a route control method and a route control system for determining a route passing through several nodes included in a network so as to set a requested data flow in response to a flow requested by a terminal.

BACKGROUND

In a network including a plurality of nodes and many links for connecting the nodes, a route control system determines an optimum route for a flow in the network in accordance with constraint conditions such as an accessibility condition, a traffic capacity condition, and a route length (the number of hops) condition, in response to a requested flow that has been made by a source terminal in order to transmit data to a destination terminal. The route control system operates in a network management system (NMS) which is connected to each node so as to control the each node. The route control system shifts the status of each node on the route from a sleep state corresponding to a power saving mode to a wake state corresponding to a normal enabled status, and sets (allocates) the data flow in (to) the specified route.

In order to determine the optimum route for a requested flow that meet the constraint conditions, it is proposed to determine a route that minimizes the sum of "costs". The "cost" is assumed to be expended, in execution of traffic processing, at each link on the route. The determination is made in accordance with an objective function (MIN $\{\Sigma_i, \Sigma_j, L_{i,j}\}$, wherein $L_{i,j}$ indicates a link cost value of a link from a node i to a node j). Japanese Translation of PCT International Application Publication No. 2005-518717 and Japanese Laid-open Patent Publication No. 2003-338832 disclose related techniques. The cost may be any physical amounts expended in traffic processing for each data flow by each node and each link on the route, for example. Specific examples of the physical amounts include a transmission power and a reception power of each node, a band of each link, and a connection charge for use of each link.

SUMMARY

According to an aspect of the present invention, provided is a route control system for determining a route for a data flow in a network including a plurality of nodes and a plurality of links. Each of the plurality of links connects two nodes out of the plurality of nodes or connects one of the plurality of nodes to one of a plurality of terminals. The route is a chain of links out of the plurality of links and connects two terminals out of the plurality of terminals. The route control system includes a storage unit, a status measuring unit, a cost management unit, a flow request accepting unit, a route determining unit, and a route setting unit.

The storage unit stores a link cost for each link included in the network. The status measuring unit checks a status of each node included in the network. The status is a wake state or a sleep state. The cost management unit updates the link cost for the link connected to the node in the wake state to a value smaller than any link cost for the link connected to the node in the sleep state. The flow request accepting unit accepts a flow request for setting the data flow from a source terminal out of the plurality of terminals to a destination terminal out of the plurality of terminals.

The route determining unit determines an optimum route connecting the source terminal to the destination terminal. A sum of the link costs for the optimum route is lowest among the link costs for other available routes connecting the source terminal to the destination terminal. The route setting unit sets the requested data flow in the optimum route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary data structure of a node attribute table according to an embodiment of the present invention;

FIG. 4 is a diagram illustrating an exemplary data structure of a link attribute table according to an embodiment of the present invention;

FIG. 10 is a diagram illustrating examples of a node attribute table and a link attribute table according to an embodiment of the present invention;

FIG. 13 is a diagram illustrating examples of a node attribute table and a link attribute table according to an embodiment of the present invention;

FIG. 18 is a diagram illustrating examples of a node attribute table and a link attribute table according to an embodiment of the present invention;

DESCRIPTION OF EMBODIMENTS

When it is allowed, in the network under route control, to shift the status of a node which does not process traffic to the sleep state corresponding to the power saving mode, an end-to-end route may be configured to be such that the number of nodes (in wake state) in the network is minimized so as to maximize power saving effect provided by bringing nodes into the sleep state.

In an existing system, a constant predefined for each node is used as the "cost". Therefore, a route may be set so as to pass through a node in the sleep state, which is set such that its "cost" is low, even when it may be possible to set a route so as to pass through a node which is already in the wake state.

The power consumption characteristics of a node is not dependent on the number of data flows which are set in each node (an amount of traffic processing executed by each node) and an increase in the number of data flows set in each node hardly increases the power consumption. Therefore, in the existing system, setting of a new data flow may lead to an increase in the number of nodes to be shifted to the wake state and hence the power consumption of the entire network may be increased.

Accordingly, it is preferable to provide a route control method that allows determination of a route of a data flow on a network such that an increase in power consumption of the entire network may be suppressed. In other words, it is preferable to determine an optimum route in accordance with the constraint conditions such as the accessibility condition, the traffic capacity condition, and the route length (the number of hops) condition, from the viewpoint of attaining power saving of the entire network, and shift the status of each node on the route from the sleep state to the wake state corresponding to the normal enabled status, so as to set (allocates) the data flow in (to) the route.

Embodiments of the present invention will be discussed with reference to the drawings.

First Embodiment

Figure 1:
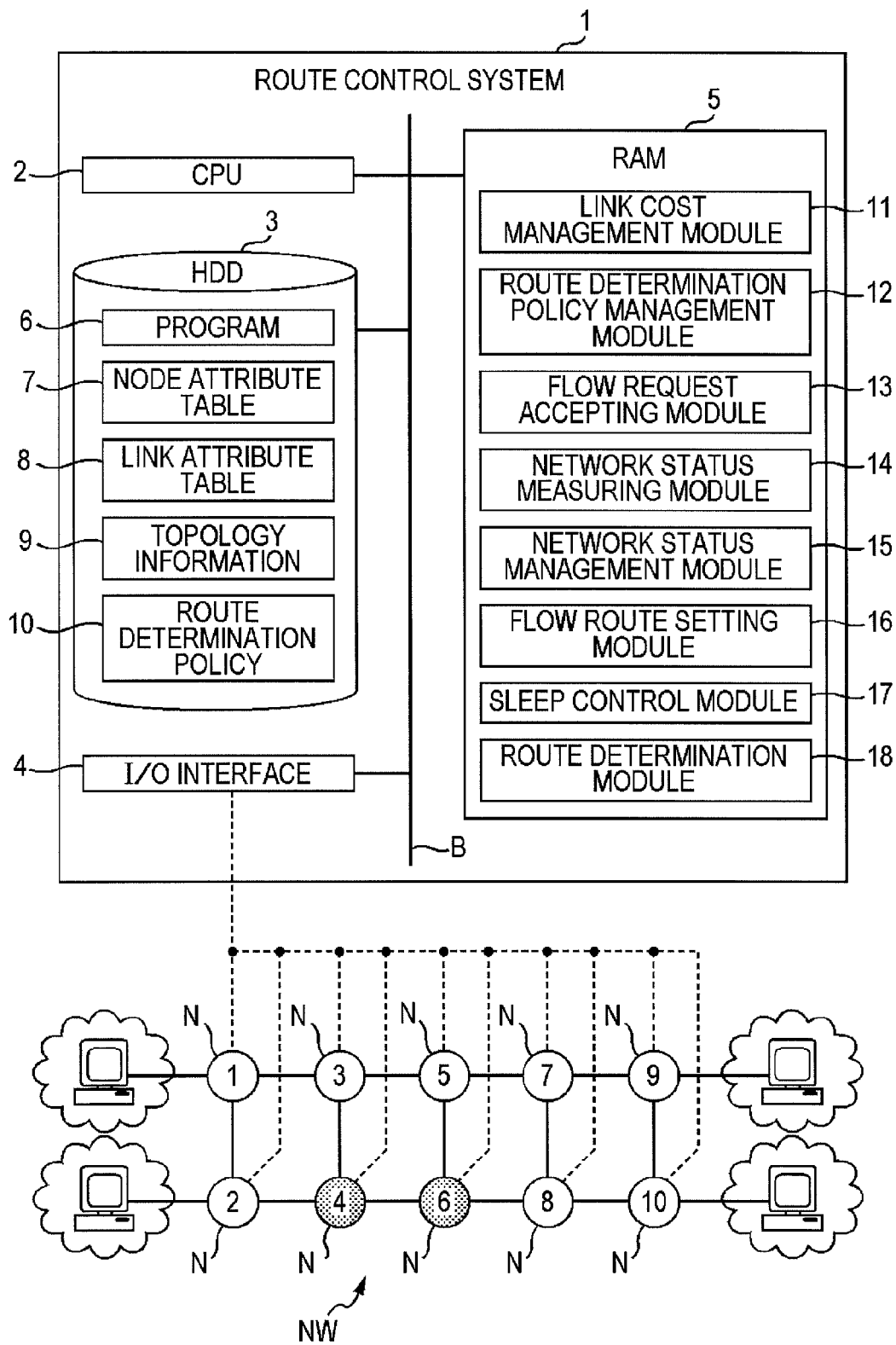
FIG. 1 is a diagram illustrating an exemplary configuration of a network according to an embodiment of the present invention.

FIG. 1 illustrates an exemplary configuration of a network according to the present embodiment. As illustrated in FIG. 1, a route control system 1 according to the present embodiment is connected to each of a plurality of nodes N included in a network NW. The plurality of nodes N are linked with one another by links. The route control system 1 is implemented as one function of a server (a network management system: NMS) that monitors the status of each node N and controls the respective nodes N such that the nodes may be on a route of a data flow. That is, the route control system 1 is implemented by installing a route control program 6 into a hard disk drive (HDD) 3 of a computer having a general hardware configuration as the server, and reading respective program modules 11 to 18 of the route control program 6 into a random access memory (RAM) 5 and executing the program modules 11 to 18 by a central processing unit (CPU) 2. The route control system 1 also includes an input/output (I/O) interface 4 which is connected to each node N. The CPU 2, the HDD 3, the RAM 5, and the I/O interface 4 are connected with one another via a bus B.

The program modules 11 to 18 included in the route control program 6 are a link cost management module 11, a route determination policy management module 12, a flow request accepting module 13, a network status measuring module 14, a network status management module 15, a flow route setting module 16, a sleep control module 17, and a route determination module 18 which cause the CPU 2 to execute a link cost management process, a route determination policy management process, a flow request accepting process, a network status measuring process, a network status management process, a flow route setting process, a sleep control process, and a route determination process, respectively.

Figure 2:
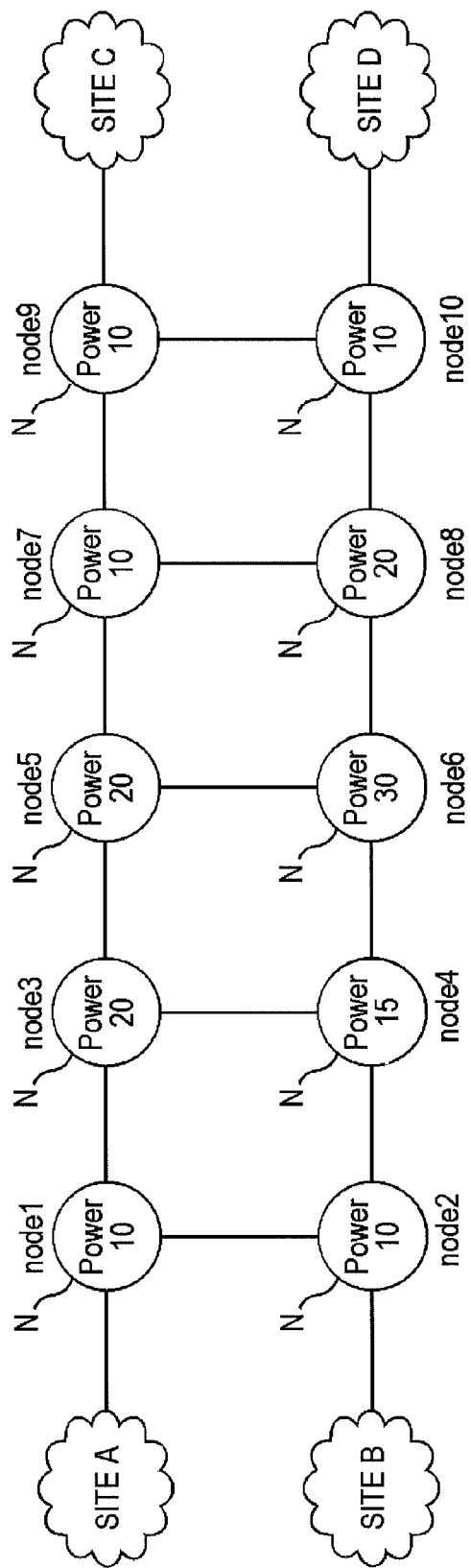
FIG. 2 is a diagram illustrating an exemplary topology of a network.

The CPU 2 in the network status management process stores topology information 9 indicative of a topology (that is, a manner in which the respective nodes N are connected with one another via links) of the network NW in the HDD 3 and manages the stored information. FIG. 2 illustrates an exemplary topology of the network NW. In the present embodiment, for simplification of explanation, it is assumed that the topology of the network NW is set such that ten nodes N (node1 to node10) are connected with one another via links in a ladder form as a whole, as illustrated in FIG. 2. Each of the both ends of respective supports of the ladder is connected to a terminal in each site. A value of "Power" illustrated in FIG. 2 indicates power consumption (a minimum power in the wake state) of each node N in the wake state. The CPU 2 in the network status management process stores a node attribute table 7 in the HDD 3 and manages the node attribute table 7. FIG. 3 illustrates an exemplary data structure of the node attribute table 7 according to the present embodiment. The node attribute table 7 stores a "power consumption" 31 and a "utilization status" (the sleep state: "0", the wake state: "1") 32 of each node N. The utilization status is detected by the CPU 2 in the network status measuring process.

The CPU 2 in the network status measuring process checks the utilization status of each node N and the CPU 2 in the network status management process refers to the check result. The CPU 2 in the network status measuring process measures a status of a traffic flow through each link connecting nodes N in the network NW and consolidates the measured values. The CPU 2 in the network status management process refers to the consolidated measured values indicating the status of the traffic flow through each link. The CPU 2 in the network status management process stores the measured values (or values indicative of a traffic status, which has been estimated on the basis of a history of values which have been measured in a past fixed term) in a link attribute table 8 stored in the HDD 3 serving as a storage unit.

FIG. 4 illustrates an exemplary data structure of the link attribute table 8 according to the present embodiment. As illustrated in FIG. 4, the link attribute table 8 is a table in which the attributes of each link connecting the nodes N or connecting an end node N with a terminal are registered. In the example illustrated in FIG. 4, the link attributes include a "flow-in destination node" 41, a "power consumption (kW)" 42, a "traffic amount (Gbps)" 43, "link upper limit constraint and physical band (Gbps)" 44, a "residual capacity (Gbps)" 45, a "link utilization status (used or unused)" 46 and a "link cost" 47 of each link. It is assumed that the units of respective parameters are determined in accordance with the policy of each operator.

The "flow-in destination node" 41 indicates a node identifier (node1 to nodeN) assigned to a destination node into which data flows through the link. Even when two nodes N are physically connected with each other via one physical resource (cable), it is assumed that there are two distinct links, i.e., an up-link and a down-link, between the two nodes N. Therefore, different link identifiers (link1 to linkM) are assigned to respective links and each flow-in destination node is defined for each link such that each of the up-link and the down-link may be identified.

The "power consumption" 42 indicates power consumption (for example, power consumption of a physical resource) which is consumed in the link itself when the link is utilized.

The "traffic amount" 43 indicates a sum of traffic amounts of the all data flows whose route pass through the link.

The "link upper limit constraint" 44 indicates an allowed upper limit of the sum of traffic amounts of the data flows whose routes pass through the link.

The "physical band" 44 indicates a band that a physical resource of the link may hold.

The "residual capacity" 45 indicates a residual obtained by subtracting the value of the "traffic amount" 43 from the value of the "link upper limit constraint" 44, that is, a traffic amount of an allowable data flow whose route additionally passes through the link.

The value of the "link utilization status" 46 is "0" when no route is set to pass the link and is "1" when any route of at least one data flow is set to pass the link.

Figure 5:
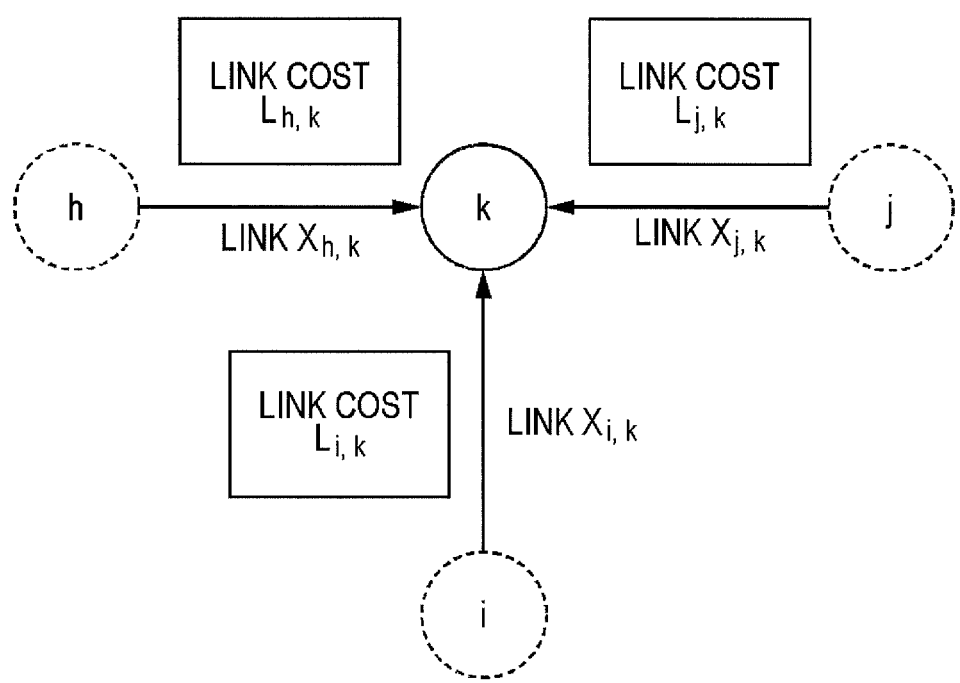
FIG. 5 is a diagram illustrating an example a link cost according to an embodiment of the present invention.
Figure 6:
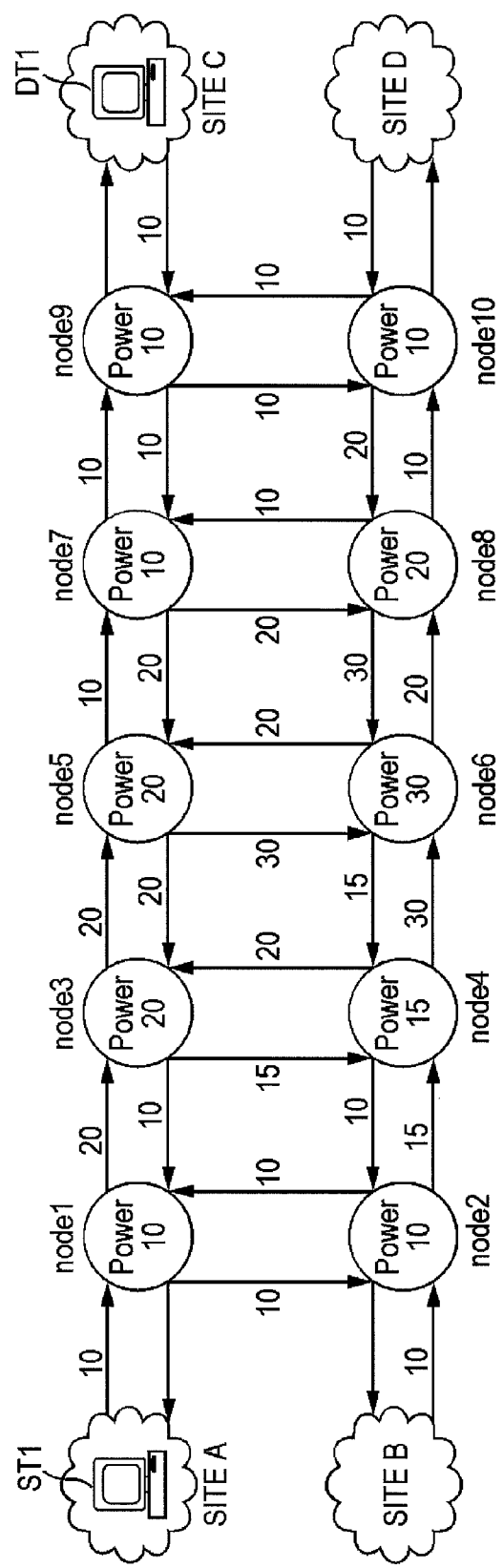
FIG. 6 is a diagram illustrating an example of a link cost allocated to each link according to an embodiment of the present invention.

The "link cost" 47 indicates the power consumption which is defined in the node attribute table for the flow-in destination node. That is, in the present embodiment, the power consumption of each node for implementing each data flow is adopted as the "link cost" 47. FIG. 5 illustrates an example the link cost according to the present embodiment. As illustrated in FIG. 5, a node (k) is the destination node of each of the links ($X_{h,k}$, $X_{i,k}$, and $X_{j,k}$) through which data flows from other nodes (h, i, and j) into the node (k). The power consumption of the destination node (k) is allocated to each of the links ($X_{h,k}$, $X_{i,k}$, and $X_{j,k}$) as respective link costs ($L_{h,k}$, $L_{i,k}$, and $L_{j,k}$) so that the sum of the "link costs" may be obtained by a calculation based on the links. FIG. 6 illustrates examples of the "link costs" 47 allocated to respective links included in the network NW having a topology as illustrated in FIG. 2. In FIG. 6, each arrow indicates each of up-links and down-links and each numeral assigned to each arrow indicates the link cost of the each link. In FIG. 4, a value "δ (a very small value)" is a constant which is written over the "link" in place of the power consumption of the flow-in destination node and is a value which is sufficiently smaller than the original power consumption. The value of "δ" may, as will be discussed later, be a value corresponding to increased power consumption when another flow route is additionally set on a node in the wake state, for example, the value of "δ" may be obtained by decreasing an original power consumption by a rate which is of the order of a factor of ten thousand or a constant.

The CPU 2 in the link cost management process manages the "link cost" of each link registered in the link attribute table 8.

The CPU 2 in the flow request accepting process accepts, from one of terminals installed on respective sites, a request (referred to as a flow request or a flow setting request) for setting a requested flow to communicate with a specific destination. The flow setting request includes a declaration of a band used for the communication.

The CPU 2 in the route determination policy management process stores a route determination policy 10 in the HDD 3 and manages the route determination policy 10. The route determination policy 10 is an aggregation of constraint conditions for setting a requested flow. The CPU 2 in the route determination process, which will be discussed later, refers to the route determination policy 10 when determining a route in response to the flow setting request accepted by the CPU 2 in the flow request accepting process. The route determination policy 10 may include constraint conditions such as, for example, a route length (the number of hops) condition and a residual capacity condition. The route length (the number of hops) condition specifies an upper limit of the number of links on the route between terminals for the communication. The residual capacity condition requires that the sum of traffic amounts of data flows whose routes pass through a certain link should be lower than the value of the "link upper limit constraint" 44 registered in the link attribute table 8 for the link.

The CPU 2 in the route determination process determines a route along which the sum of link costs is minimized under the constraint conditions included in the route determination policy 10, as the route of a data flow from the request source terminal (the terminal that has transmitted the request) to the destination terminal in response to the flow request accepted by the CPU 2 in the flow request accepting process.

The CPU 2 in the flow route setting process sets the route which has been determined by the CPU 2 in the route determination process in the network NW in response to each flow request. That is, the CPU 2 in the flow route setting process controls each node N such that the data flow which has been determined in response to each flow request runs along the route which has been determined for the data flow.

The CPU 2 in the sleep control process controls the status of a node. When the CPU 2 in the flow route setting process sets a route of a data flow in the network NW, the CPU 2 in the sleep control process shifts the status of a node on the route, which is in the sleep state, to the wake state. When all the data flows whose routes pass through a node have run through the node, the CPU 2 in the sleep control process shifts the status of the node from the wake state to the sleep state to release the node.

Figure 7:
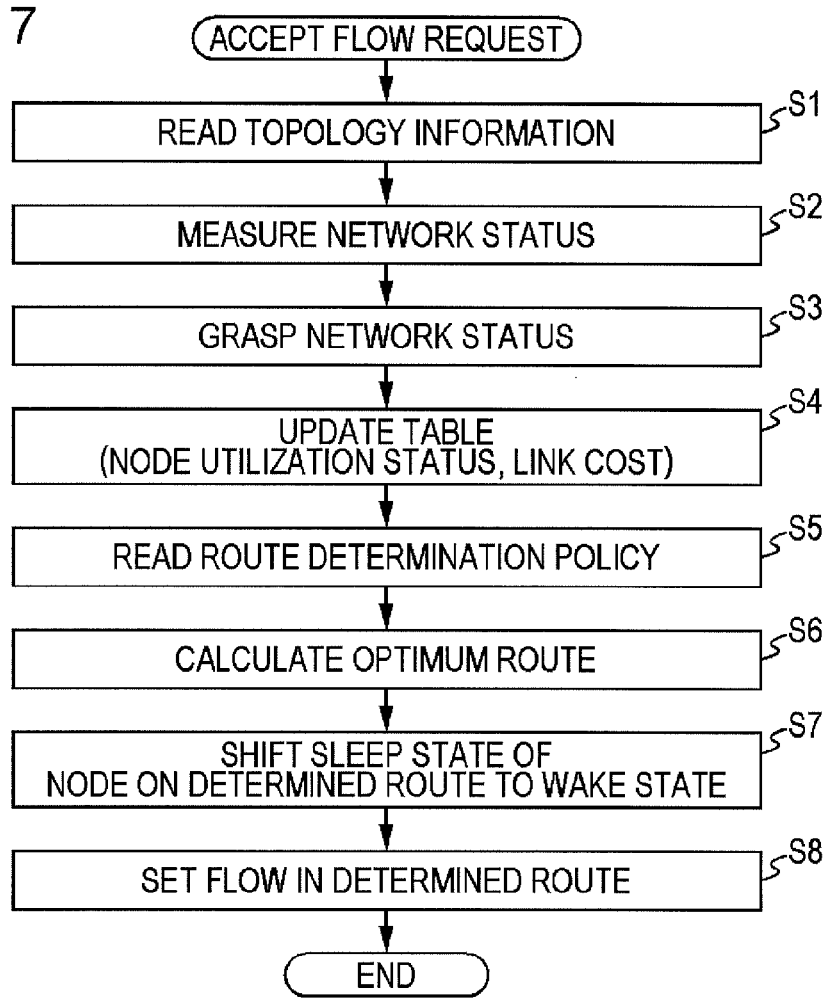
FIG. 7 is a diagram illustrating an exemplary operation flow of a route control system according to an embodiment of the present invention.
Figure 8:
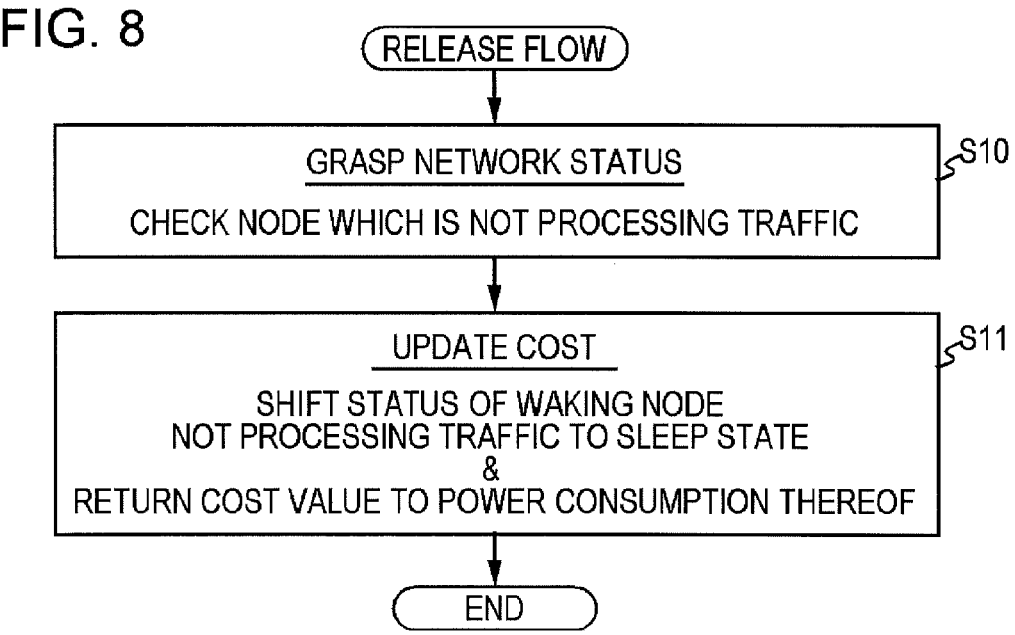
FIG. 8 is a diagram illustrating an exemplary operation flow of a route control system according to an embodiment of the present invention.

FIG. 7 illustrates an exemplary operation flow of the route control system 1 when flow setting has been requested. FIG. 8 illustrates an exemplary operation flow of the route control system 1 when releasing the flow. Operation flow of the CPU 2 caused by the route control program 6 including the above mentioned program modules 11 to 18 will be discussed with reference to FIG. 7 and FIG. 8.

The operation flow illustrated in FIG. 7 is performed when the route control system 1 has accepted a flow request from one of the terminals.

In operation S1, the CPU 2 in the network status management process reads the topology information 9 stored in the HDD 3.

In operation S2, the CPU 2 in the network status measuring process measures the network status such as the utilization status of each node N included in the network NW and the traffic flow status of each link. Alternatively, the CPU 2 in the network status measuring process may estimate the network status on the basis of a history of previous flow settings.

In operation S3, the CPU 2 in the network status management process grasps the network status on the basis of the network status measured in operation S2.

In operation S4, the CPU 2 in the network status management process updates the node attribute table 7 and the CPU 2 in the link cost management process updates the link attribute table 8, on the basis of the status of the network NW which has been grasped in operation S3. Specifically, when a node N in the wake state is present, the CPU 2 in the network status management process changes the value of the node utilization status, which has been registered in the node attribute table 7, for the node N to "1", and the CPU 2 in the link cost management process changes the value of the link cost, which has been registered in the link attribute table 8, to "$\epsilon$", for each of all the links through which data flows into the node N. When each value has already been changed before the update, the CPU 2 in the network status management process or in the link cost management process does not perform additional updating.

In operation S5, the CPU 2 in the route determination policy management process reads the route determination policy 10 stored in the HDD 3.

In operation S6, the CPU 2 in the route determination process executes calculation to determine an optimum route of a data flow from a request source terminal to a destination terminal designated by the flow request. First, the CPU 2 in the route determination process determines, under the assumption that all the links are available, whether each candidate route meets each of the constraint conditions included in the route determination policy 10. When a candidate route does not meet any one of the constraint conditions (for the residual capacity condition, the candidate route is judged not to meet the condition only when at least one link has no residual capacity), the route will be excluded from the candidate routes. Then, an objective function (MIN $\{\Sigma_i, \Sigma_j, L_{i,j}\}$: wherein $L_{i,j}$ indicates a link cost value of a link through which data flows from the node i to the node j) is evaluated for each of all the remaining routes. Specifically, the CPU 2 in the route determination process determines a route which has the smallest sum of link costs as the optimum route on the basis of the sum of link costs which have been registered in the link attribute table 8 for each link included in the candidate route. When a minimum value of the residual capacity of the links on the optimum route, which has the smallest sum of link costs is insufficient for a requested band (a band which has been requested from the request source terminal), the CPU 2 in the route determination process additionally determines a route having the second smallest sum of link costs as another optimum route in addition to the above mentioned optimum route. In some cases, a plurality of optimum routes which meet the requested band condition may be finally determined. When one or more routes (optimum routes) which meet each of the constraint conditions and have the smallest sum of link costs are determined, the CPU 2 advances the process to operation S7.

In operation S7, the CPU 2 in the sleep control process reads, from the node attribute table 7, the node utilization status of each node N on the optimum route determined in operation S6 and shifts the status of the node N in the sleep state to the wake state.

In operation S8, the CPU 2 in the flow route setting process sets a data flow for the communication, the flow request for which has been accepted, in the optimum route which has been determined in operation S6. That is, the CPU 2 in the flow route setting process sets the transfer functions of all the nodes on the route such that the data flow for the communication runs along the determined optimum route.

The operation flow illustrated in FIG. 7 has been discussed.

The operation flow illustrated in FIG. 8 is executed periodically by interrupt.

In operation S10, the CPU 2 in the network status measuring process measures or estimates the network status. The CPU 2 in the network status management process grasps the status of the network NW on the basis of the result of measurement or estimation and checks to see whether a node which is in the wake state and is not processing any traffic is present.

In operation S11, when a node which is in the wake state and is not processing any traffic is present, the CPU 2 in the sleep control process shifts the status of the node from the wake state to the sleep state. The CPU 2 in the link cost management process then returns the value of the link cost of each of all the links, through which data flows into the node, from "$\delta$" to its original power consumption of the node.

The operation flow illustrated in FIG. 8 has been discussed.

Next, examples of operations in the present embodiment with above mentioned configuration will be discussed using specific values.

First Operational Example

Figure 9:
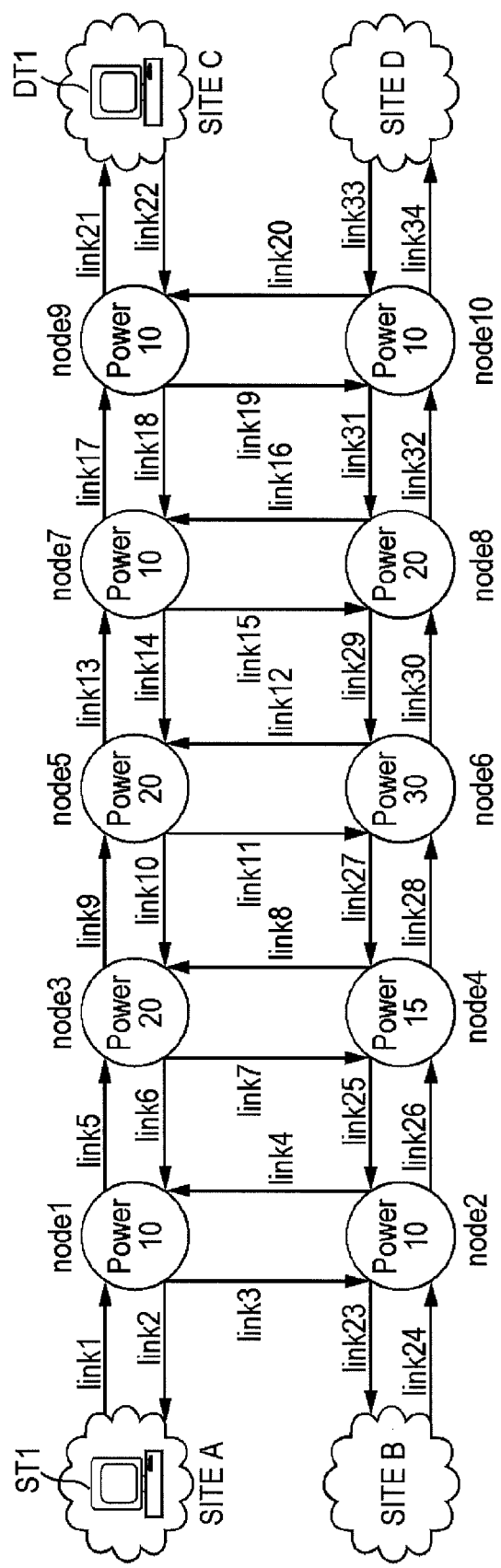
FIG. 9 is a diagram illustrating examples of identifiers for nodes and links according to an embodiment of the present invention.

FIG. 9 illustrates examples of identifiers for nodes and links. FIG. 10 illustrates examples of the node attribute table 7 and the link attribute table 8 in a status in which no route of data flows has been set. It is assumed that identifiers are assigned to respective nodes and respective links included in the network NW as illustrated in FIG. 9 and that the attributes of each node and each link are registered in the node attribute table 7 and the link attribute table 8 as illustrated in FIG. 10, that is, all the nodes N are in the sleep state.

A terminal ST1 disposed on a site A makes a request for setting a data flow for a destination terminal DT1 disposed on a site C. In the route control system 1 which has accepted the flow request, the CPU 2 in the route determination policy management process reads the route determination policy 10 (in operation S5 illustrated in FIG. 7). It is assumed that in the route determination policy 10, any route length is allowed "without any restriction" as the route length (the number of hops) condition, and the band of the requested data flow is restricted to be not more than the link residual capacity of each of all the links as the residual capacity condition.

Figure 11:
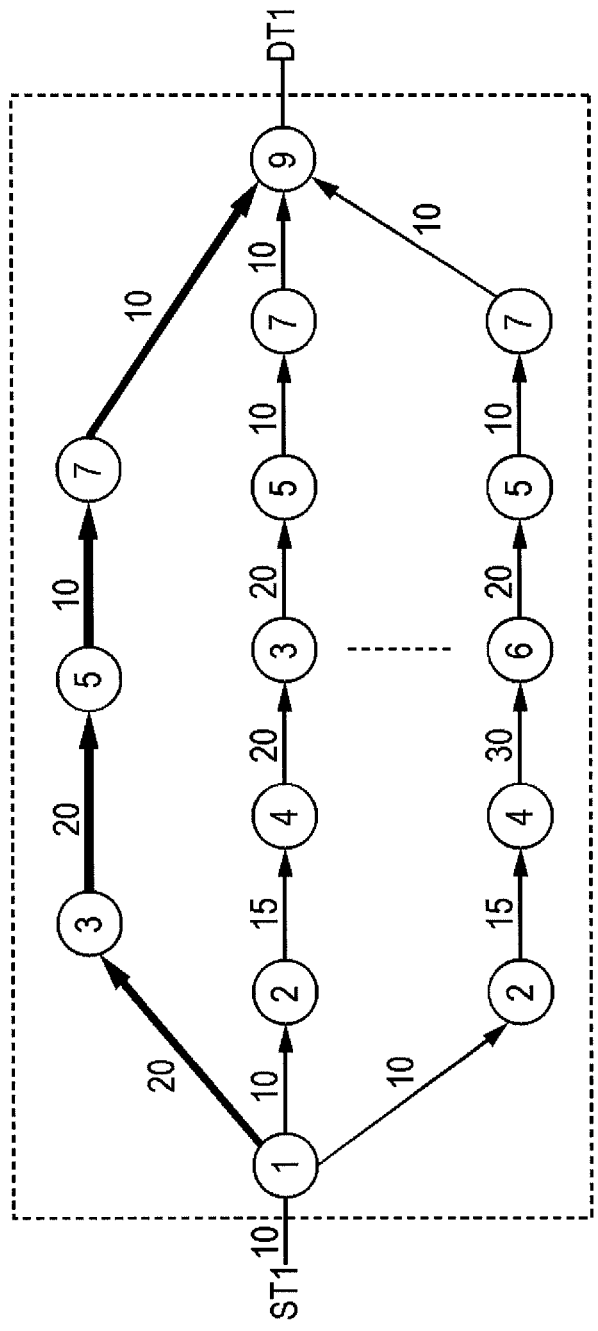
FIG. 11 is a diagram illustrating examples of candidate routes according to an embodiment of the present invention.
Figure 12:
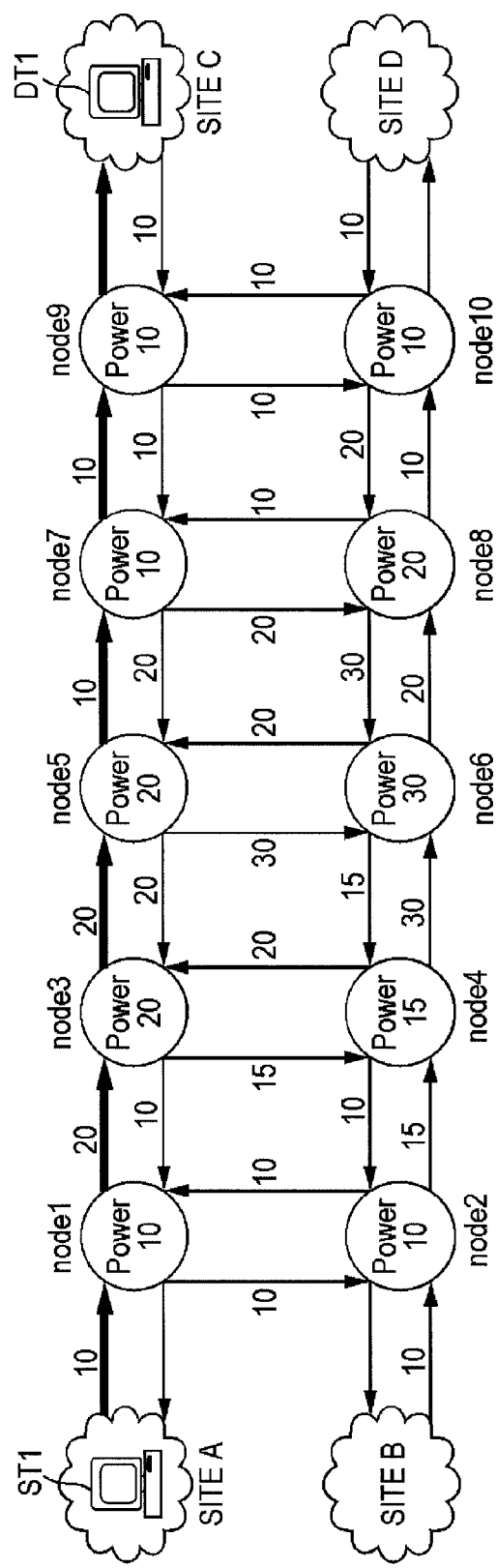
FIG. 12 is a diagram illustrating an example of a route of a first data flow according to an embodiment of the present invention.

Then, the CPU 2 in the route determination process starts calculation for the optimum route (in operation S6 illustrated in FIG. 7). The CPU 2 in the route determination process selects, as routes that meet the constraint conditions, a plurality of candidate routes from among all the routes in the network NW. FIG. 11 illustrates examples of the selected candidate routes. In FIG. 11, encircled numerals indicate nodes and node numbers thereof, arrows indicate links, and numerals appended to the arrows indicate link costs of the corresponding links. The CPU 2 in the route determination process evaluates the objective function (MIN $\{\Sigma_i, \Sigma_j, L_{i,j}\}$)

for each of the candidate routes to determine the optimum route which has the smallest sum of link costs. FIG. 12 illustrates an example of a route of a first data flow. In this example, it is assumed that the route of the first data flow is the route passing through node1, node3, node5, node7, and node9, which is denoted by bold arrows in FIG. 12.

The CPU 2 in the sleep control process shifts the status of all the nodes N (node1, node3, node5, node7, and node9) on the optimum route to the wake state. The CPU 2 in the flow route setting process sets a data flow for the communication, the flow request for which has been made, in the optimum route.

Figure 14:
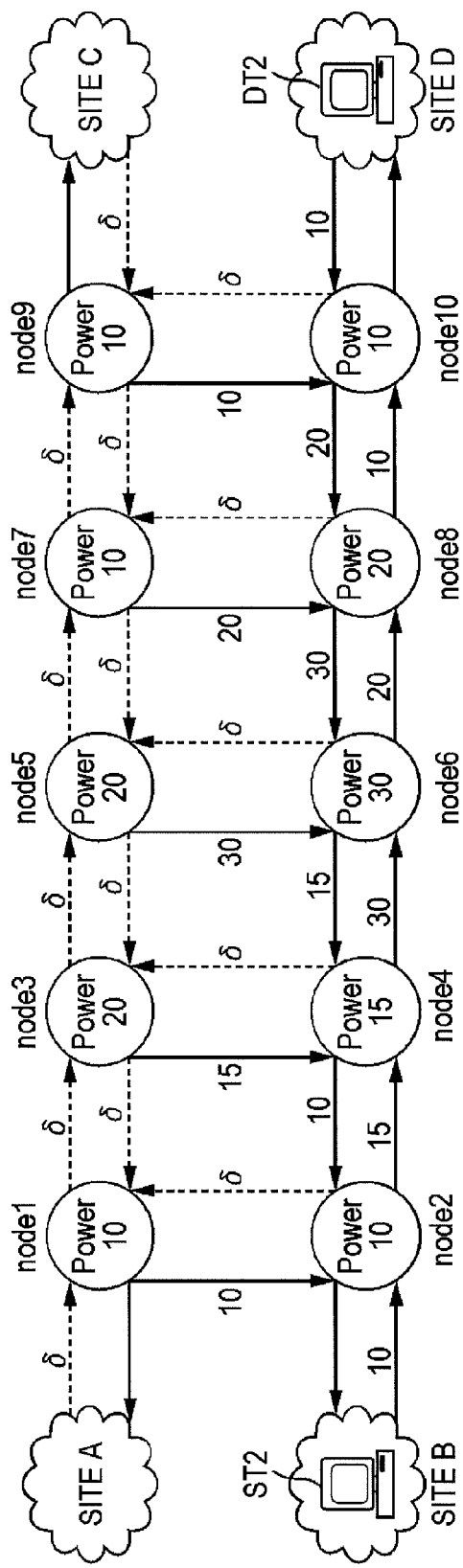
FIG. 14 is a diagram illustrating an example of a link cost allocated to each link according to an embodiment of the present invention.

In a status in which flow setting has been made between the terminals ST1 and DT1 as discussed above, a terminal ST2 disposed on a site B makes a request for setting a data flow for a destination terminal DT2 disposed on a site D. In the route control system 1 which has accepted the flow request, the CPU 2 in the network status management process determines, in accordance with the operation flow illustrated in FIG. 7, that the nodes N (node1, node3, node5, node7, and node9) are in the wake state in accordance with the network status which has been measured by the CPU 2 in the network status measuring process and shifts each of the node utilization status of the nodes N (node1, node3, node5, node7, and node9) registered in the node attribute table 7 from "0" to "1" (the wake state). The CPU 2 in the link cost management process updates the value, which has been registered in the link attribute table 8, of the link cost of all the links through which data flows into the above mentioned nodes N (node1, node3, node5, node7, and node9) to "δ". FIG. 13 illustrates examples of the node attribute table 7 and the link attribute table 8 in a status in which the route of the first data flow has been set. FIG. 14 illustrates an example of a link cost allocated to each link in a status in which the route of the first data flow has been set.

Next, CPU 2 in the route determination policy management process reads the route determination policy 10 (in operation S5 illustrated in FIG. 7). As discussed above, in the route determination policy 10, any route length is allowed "without any restriction" as the route length (the number of hops) condition and the band of the requested data flow is restricted to be not more than the link residual capacity of each link as the residual capacity condition.

Figure 15:
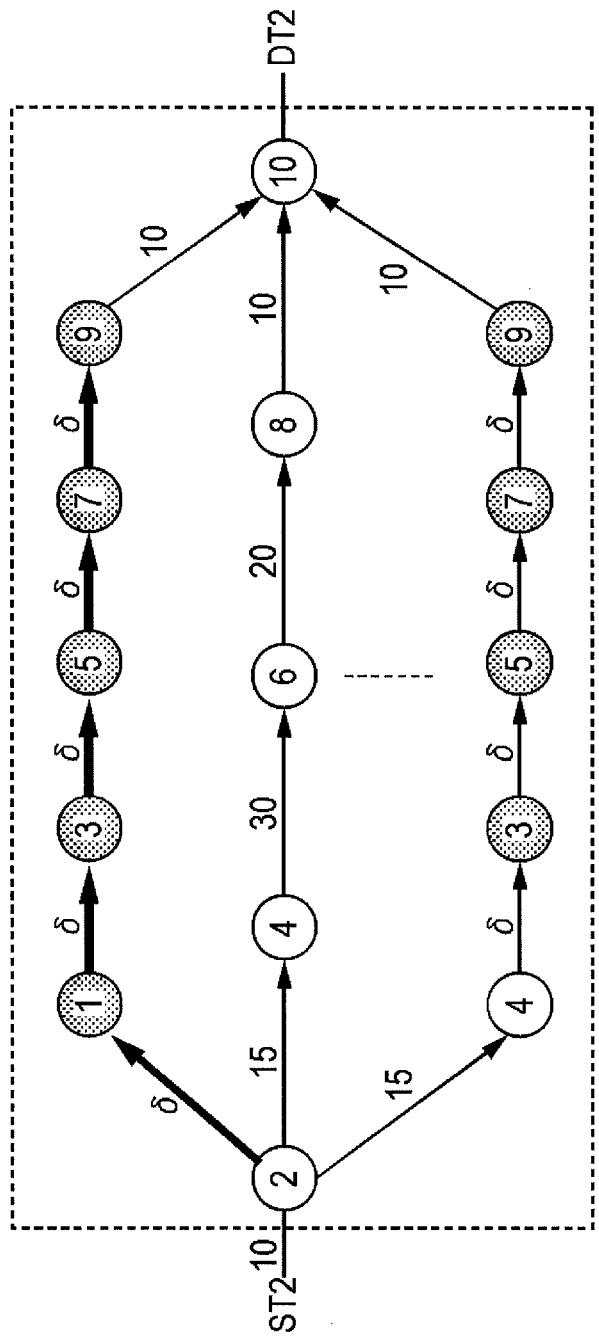
FIG. 15 is a diagram illustrating examples of candidate routes according to an embodiment of the present invention.
Figure 16:
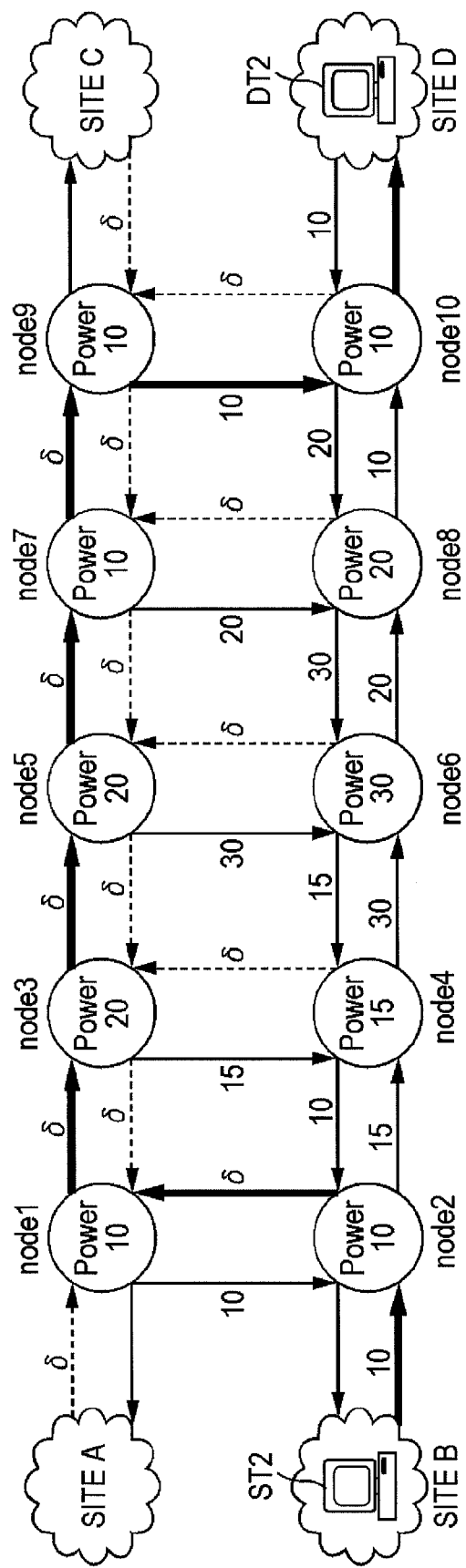
FIG. 16 is a diagram illustrating an example of a route of a second data flow according to an embodiment of the present invention.

Then, the CPU 2 in the route determination process starts calculation for the optimum route (in operation S6 illustrated in FIG. 7). The CPU 2 in the route determination process selects a plurality of candidate routes, as routes that meet the constraint conditions, from among all the routes in the network NW. FIG. 15 illustrates examples of the selected candidate routes. In FIG. 15, the numerals indicate the node numbers or the link costs as in the case with the numerals in FIG. 11. The CPU 2 in the route determination process evaluates the objective function (MIN $\{\Sigma_i, \Sigma_j, L_{i,j}\}$) for each of the candidate routes to determine the optimum route which has the smallest sum of link costs. FIG. 16 illustrates an example of a route of a second data flow. Since the link cost of link4, link5, link9, link13, and link17 has been updated to "δ" in operation S4, the CPU 2 in the route determination process determines a route, which is denoted by bold arrows in FIG. 16, passing through node2, node1, node3, node5, node7, node9, and node10 as the optimum route which has the smallest sum of link costs.

The CPU 2 in the sleep control process shifts the status of node2 and node10 on the optimum route to the wake state. The CPU 2 in the flow route setting process sets a data flow for the communication, the flow request for which has been made, in the optimum route.

Figure 17:
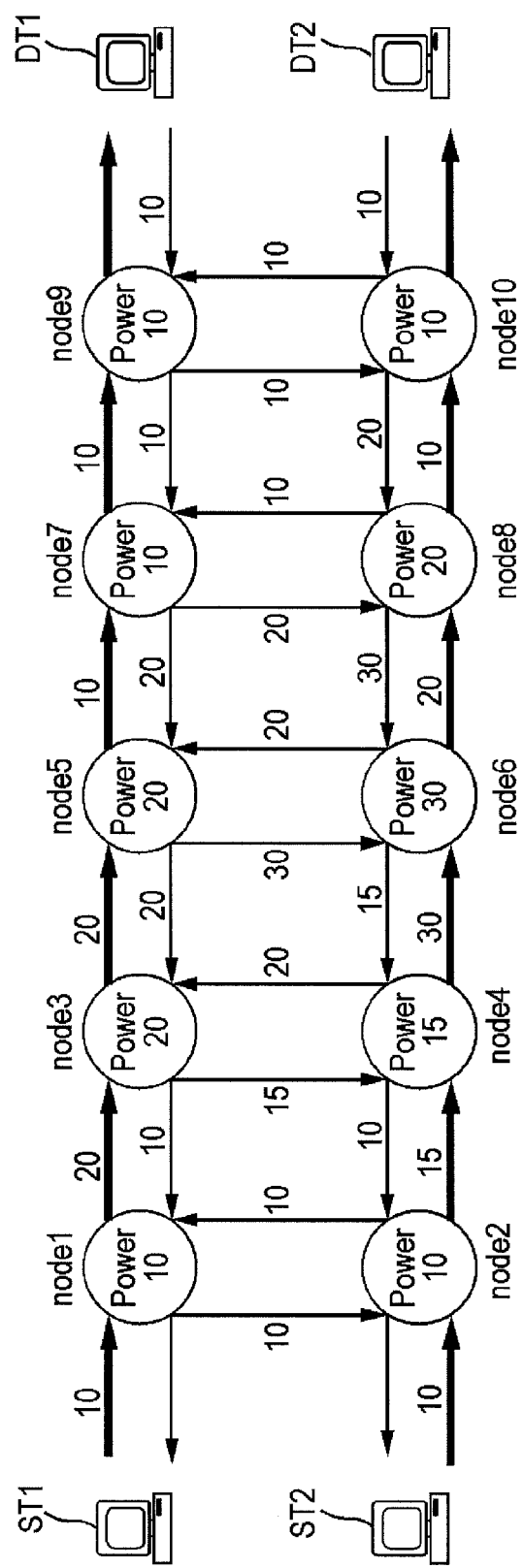
FIG. 17 is a diagram illustrating an example of a route of a second data flow.

FIG. 17 illustrates an example of a route of the second data flow determined when link costs have not been updated. If the link cost of each link is not updated after the route of the first data flow has been determined, the CPU 2 in the route determination process may determine, as illustrated in FIG. 17, a route passing through node2, node4, node6, node8, and node10 as the optimum route of the second data flow by evaluating the objective function (MIN $\{\Sigma_i, \Sigma_j, L_{i,j}\}$) for each route. As a result, the CPU 2 in the sleep control process may shift the status of node4, node6, and node8, in addition to node2 and node10, to the wake state. Hence, the power consumption of the entire network NW will be increased by the amount corresponding to the power consumptions of these three nodes N. On the other hand, in the present embodiment, node4, node6, and node8 may be retained in the sleep state and hence the power consumption of the entire network NW may be reduced by the amount corresponding to the power consumptions of these three nodes.

FIG. 18 illustrates examples of the node attribute table 7 and the link attribute table 8 in a status in which the route of the second data flow has been set. By executing operation S4 illustrated in FIG. 7 again, the CPU 2 in the network status management process updates the node attribute table 7 and the CPU 2 in the link cost management process updates the link attribute table 8 to those as illustrated in FIG. 18.

Second Operational Example

The second operational example will discuss an example of operations to be executed when the situation conflicts with the residual capacity condition.

It is assumed that a residual capacity α of link4 is not reduced to zero but is insufficient for a requested band β when the flow request has been made by the terminal ST2 in the first operational example. When the terminal ST2 disposed on the site B makes a request for setting a data flow for the destination terminal DT2 disposed on the site D, in the route control system 1 which has accepted the flow request, the CPU 2 in the route determination policy management process reads the route determination policy 10 (in operation S5 illustrated in FIG. 7). It is also assumed that the route determination policy 10 is similar to that in the first operational example.

Figure 19:
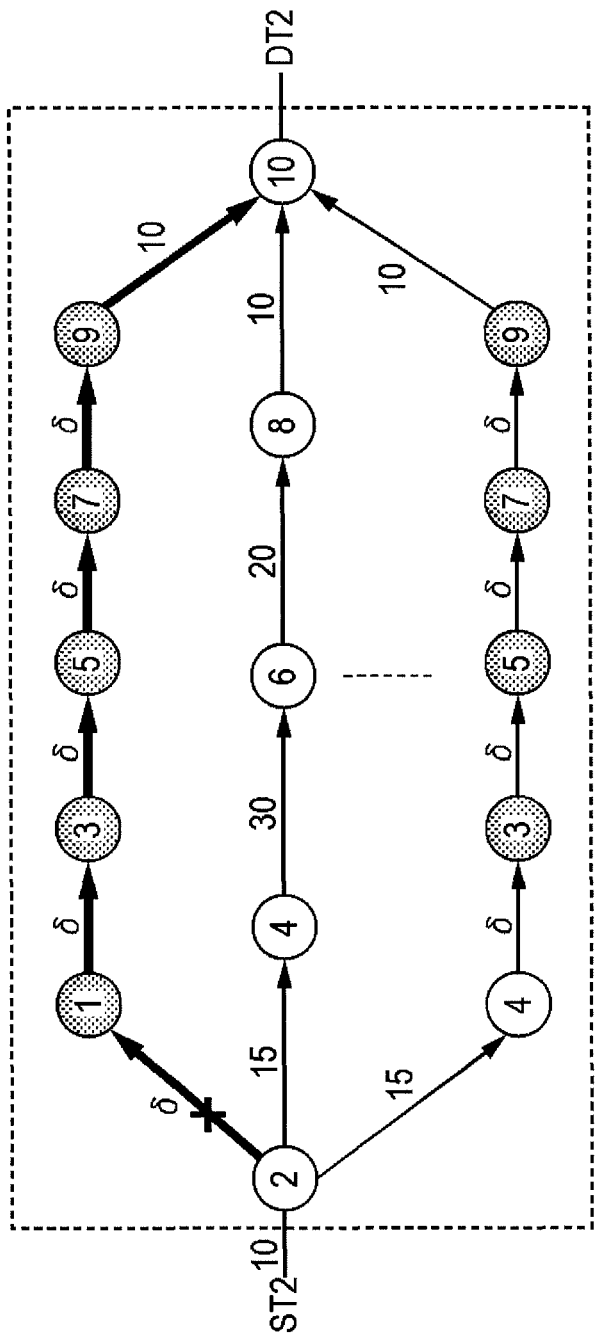
FIG. 19 is a diagram illustrating examples of candidate routes according to an embodiment of the present invention.

Then, the CPU 2 in the route determination process starts calculation for the optimum route (in operation S6 illustrated in FIG. 7). The CPU 2 in the route determination process selects a plurality of candidate routes, as the routes that meet the constraint conditions, from among all the routes in the network NW. FIG. 19 illustrates examples of the selected candidate routes. Link4 which runs from node2 toward node1 is not excluded from the candidate routes because its residual capacity α is not reduced to zero although it is insufficient for the requested band β.

Figure 20:
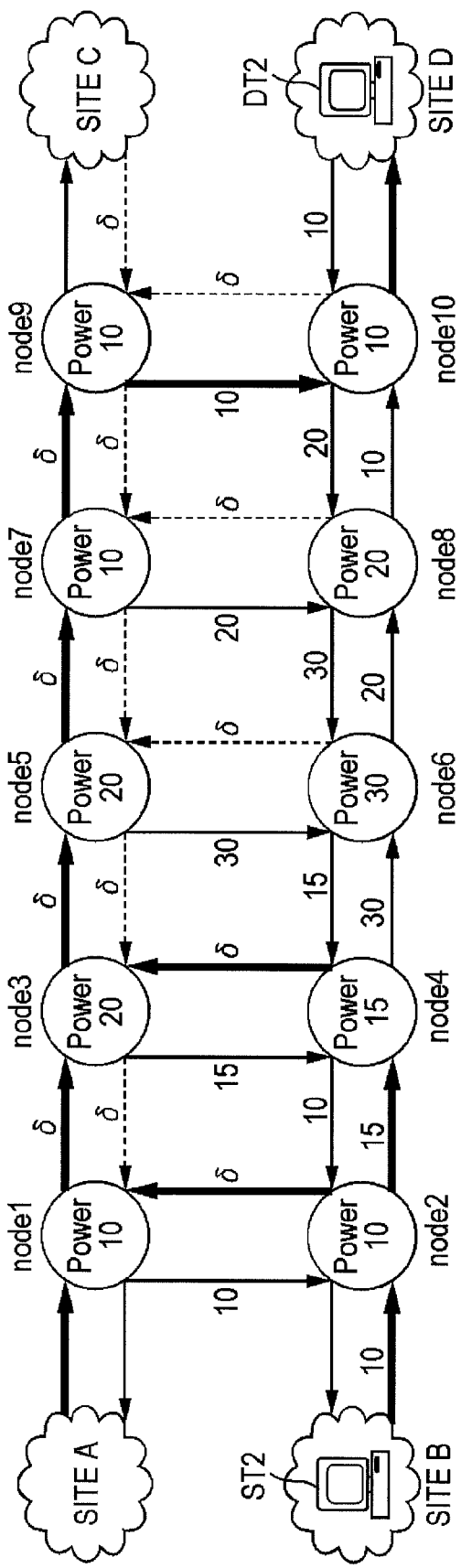
FIG. 20 is a diagram illustrating an example of routes of a second data flow according to an embodiment of the present invention.

The CPU 2 in the route determination process evaluates the objective function (MIN $\{\Sigma_i, \Sigma_j, L_{i,j}\}$) for each route to determine the optimum route which has the smallest sum of link costs. The CPU 2 in the route determination process determines a route, which is denoted by bold arrows in FIG. 16, passing through node2, node1, node3, node5, node7, node9, and node10 as a primary optimum route which has the smallest sum of link costs. The residual capacity α of link4 on this route is insufficient for the requested band β and hence part of the data flow will overflow the route. Therefore, CPU 2 in the route determination process additionally determines a route, which has the second smallest sum of link costs, passing through node2, node4, node3, node5, node7, node9, and node10 as a secondary optimum route to which part of the data flow of the amount (β−α) bps which will overflow the primary optimum route will be transferred. As a result, two routes have been determined as the routes of the data flow for one piece of communication and will be used in parallel with each other. FIG. 20 illustrates examples of the two routes in which the second data flow has been set.

The CPU 2 in the sleep control process shifts the status of node2, node4, and node10, which are in the sleep state, on the two routes to the wake state. The CPU 2 in the flow route setting process sets the data flow for the communication, the flow request for which has been made, in the two routes.

Third Operational Example

Figure 21:
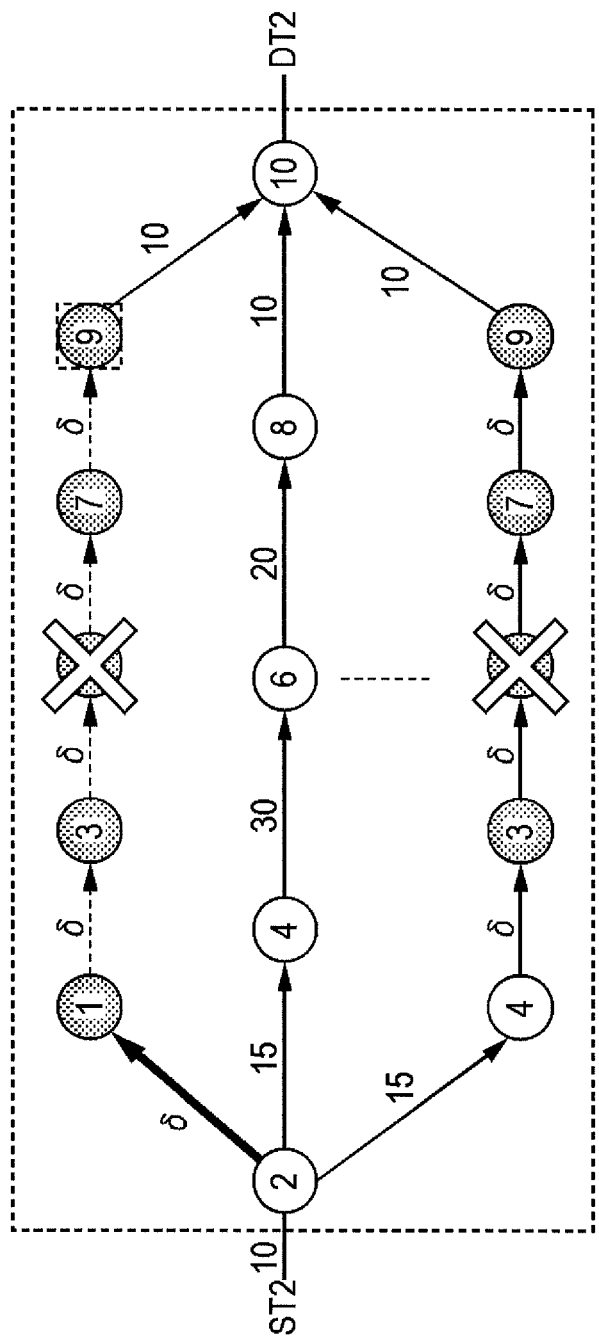
FIG. 21 is a diagram illustrating examples of a candidate route according to an embodiment of the present invention.
Figure 22:
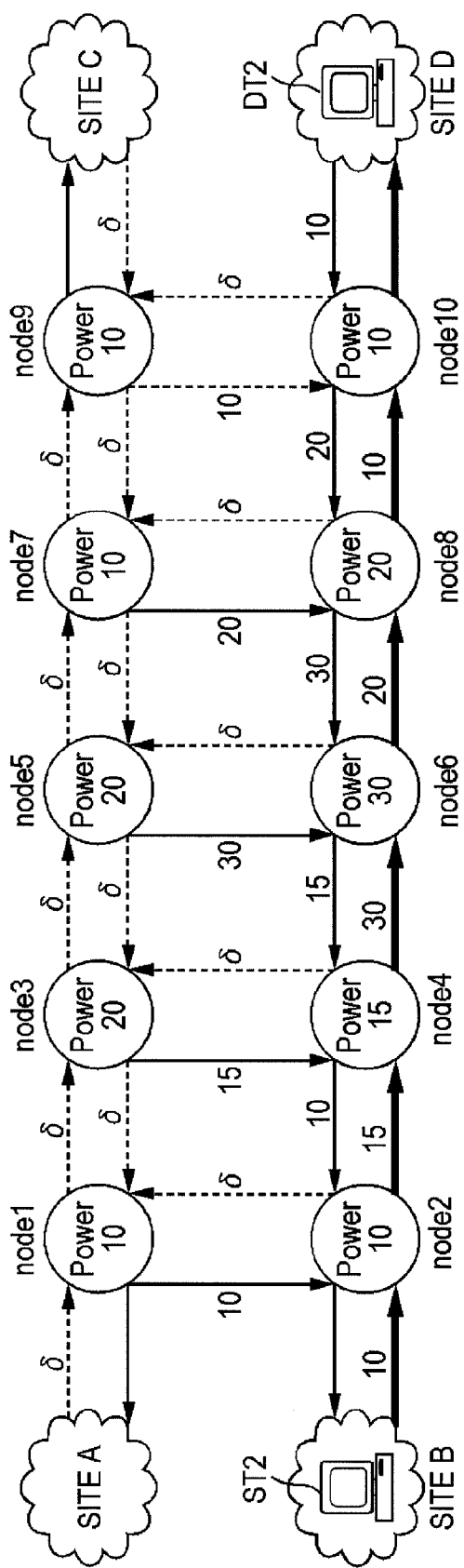
FIG. 22 is a diagram illustrating an example of a route of a data flow according to an embodiment of the present invention.

The third operational example will discuss an example of operations to be executed when the situation conflicts with the route length (the number of hops) condition. In the present operational example, it is assumed that "5" is set as the route length (the number of hops) condition included in the route determination policy 10. When the terminal ST2 disposed on the site B makes a request for setting a data flow for the destination terminal DT2 disposed on the site D after the data flow has been set in the route from the terminal ST1 disposed on the site A to the terminal DT1 disposed on the site C, in the route control system 1 which has accepted the flow request, the CPU 2 in the route determination policy management process reads the route determination policy 10 (in operation S5 illustrated in FIG. 7). Then, the CPU 2 in the route determination process starts calculation for the optimum route (in operation S6 illustrated in FIG. 7). The routes which pass through any one of node1, node3, node5, node7, and node9, which are in the wake state, do not meet the route length (the number of hops) condition and hence are excluded from the candidate routes. Finally, only the route which passes through node2, node4, node6, node8, and node10 is extracted as the candidate route. Therefore, the route is determined as the optimum route with no evaluation of the objective function (MIN $\{\Sigma_i, \Sigma_j, L_{i,j}\}$) for any route. FIG. 21 illustrates an example of the selected candidate route. FIG. 22 illustrates an example of the route in which the data flow has been set.

Second Embodiment

In the first embodiment, the power consumption of the entire network is reduced by minimizing the number of nodes whose status is shifted from the sleep state to the wake state under the assumption that the status of the node is shifted from the sleep state to the wake state only when the node transferring traffic.

In the present embodiment, the power consumption of the entire network is reduced by minimizing the number of (physical resources of) links whose status are shifted from the sleep state to the wake state under the assumption that a (physical resource of) link which does not take part in a traffic transferring is allowed to be shifted from the wake state in which the power consumption is large to the sleep state in which the power consumption is small.

Figure 23:
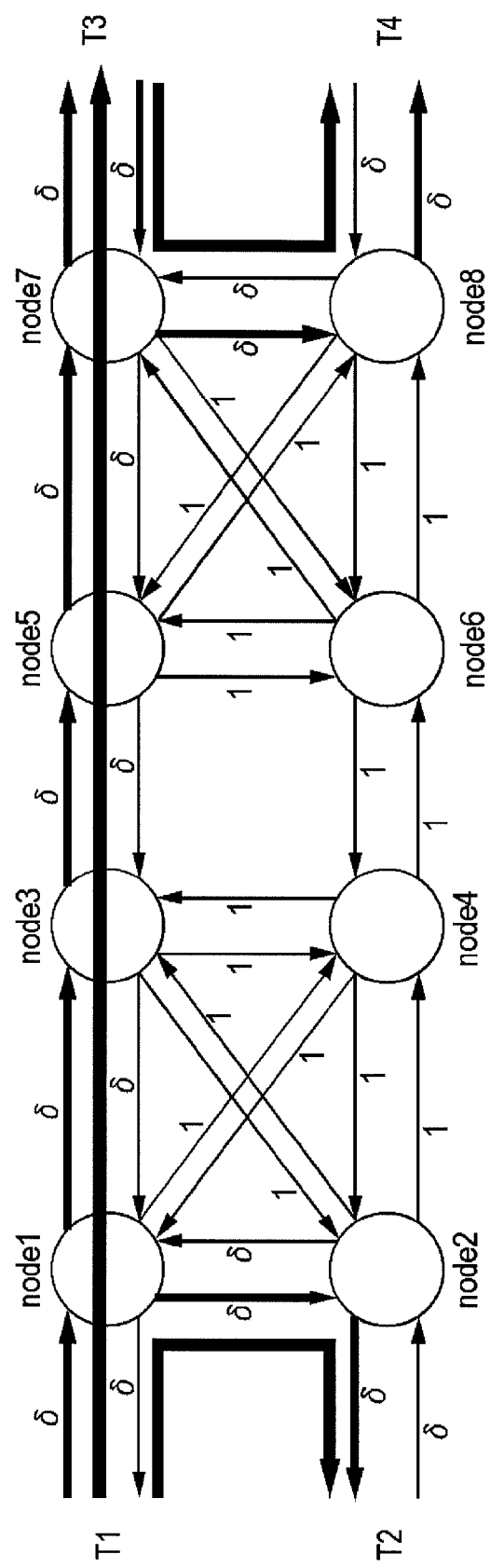
FIG. 23 is a diagram illustrating an example of a network according to an embodiment of the present invention.

The CPU 2 in the sleep control process controls status shift between the wake state and the sleep state of each link, and shifts the status of a link on the route of the data flow to the wake state and shifts the status of a link off the route of the data flow to the sleep state. The CPU 2 in the network status measuring process checks whether each link is in the wake state or in the sleep state. FIG. 23 illustrates an example of a network according to the present embodiment. The CPU 2 in the link cost management process manages the link attribute table 8 such that the link cost of the link off the route is changed to "1" and the link costs of the link on the route and the link in the opposite direction thereto are changed to "δ" (a value which is sufficiently smaller than "1") as illustrated in FIG. 23. Other configurations of the network in the present embodiment are similar to those in the first embodiment and hence discussion thereof will be omitted.

Figure 24:
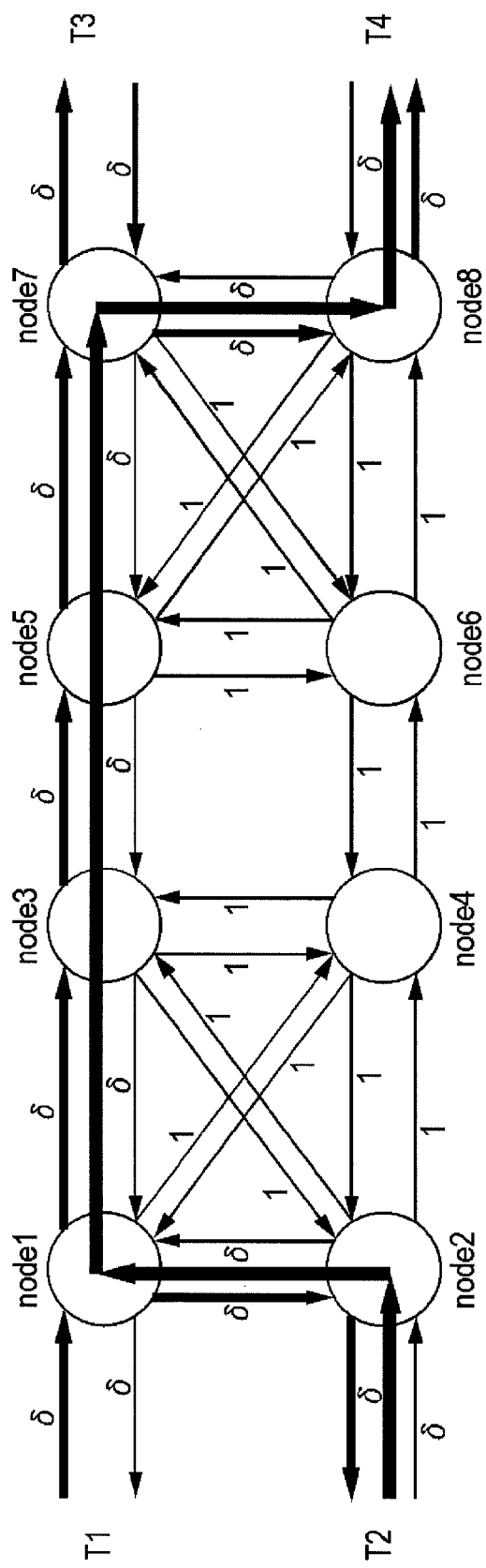
FIG. 24 is a diagram illustrating an example of a route of a data flow according to an embodiment of the present invention.

FIG. 23 illustrates an example of a network according to the present embodiment. In a situation in which a data flow from a terminal T1 to a terminal T3, a data flow from the terminal T1 to a terminal T2, and a data flow from the terminal T3 to a terminal T4 are set as illustrated in FIG. 23, the link costs of the respective links are as illustrated in FIG. 23. When a request for setting a data flow from the terminal T1 to the terminal T4 is made, the CPU 2 in the route determination process determines a route passing through node2, node1, node3, node5, node7, and node8 as the optimum route since the route has the smallest sum (δ×6) of link costs. FIG. 24 illustrates an example of the route in which the data flow has been set. Since the physical resources of the links on the route are already utilized on other routes, so that it may be unnecessary to shift the status of the physical resource of a new link to the wake state and hence the power consumption of the entire network may not be increased so much.

Third Embodiment

In the present embodiment, it is assumed that the status of the node is shifted from the sleep state to the wake state only when the node transferring the traffic as in the first embodiment and the status of the physical resource of the link is shifted from the sleep state to the wake state only when the link transferring the traffic as in the second embodiment.

The CPU 2 in the sleep control process controls status shift between the wake state and the sleep state of each node as in the first embodiment and controls status shift between the wake state and the sleep state of the physical resource of each link as in the second embodiment. The CPU 2 in the network status measuring process checks whether each node is in the wake state or in the sleep state as in the first embodiment and checks whether each link is in the wake state or in the sleep state as in the second embodiment. The CPU 2 in the link cost management process manages the link cost registered in the link attribute table 8 as the sum of the power consumption (a very small value "δ1" when the node is in the wake state) of the node into which data flows through the link and the power consumption (a very small value "δ2" when the link is in the wake state, or "1" when the link is in the sleep state) of the link itself. Other configurations of the network in the present embodiment are similar to those in the first embodiment and hence discussion thereof will be omitted.

Figure 25:
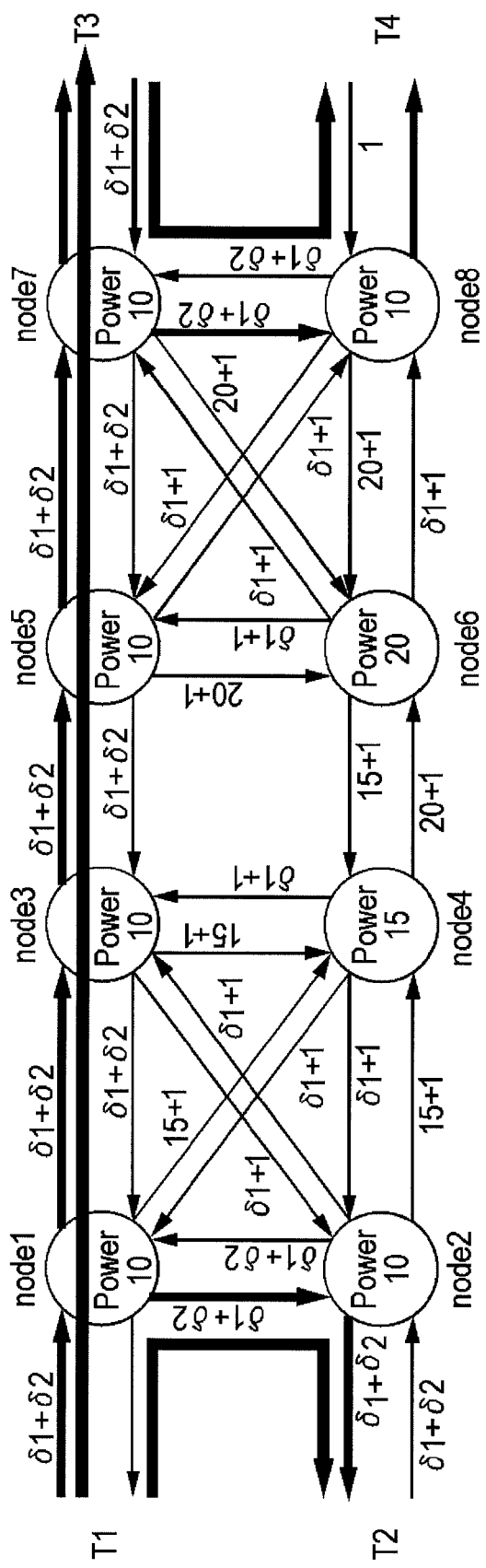
FIG. 25 is a diagram illustrating an example of a network according to an embodiment of the present invention.
Figure 26:
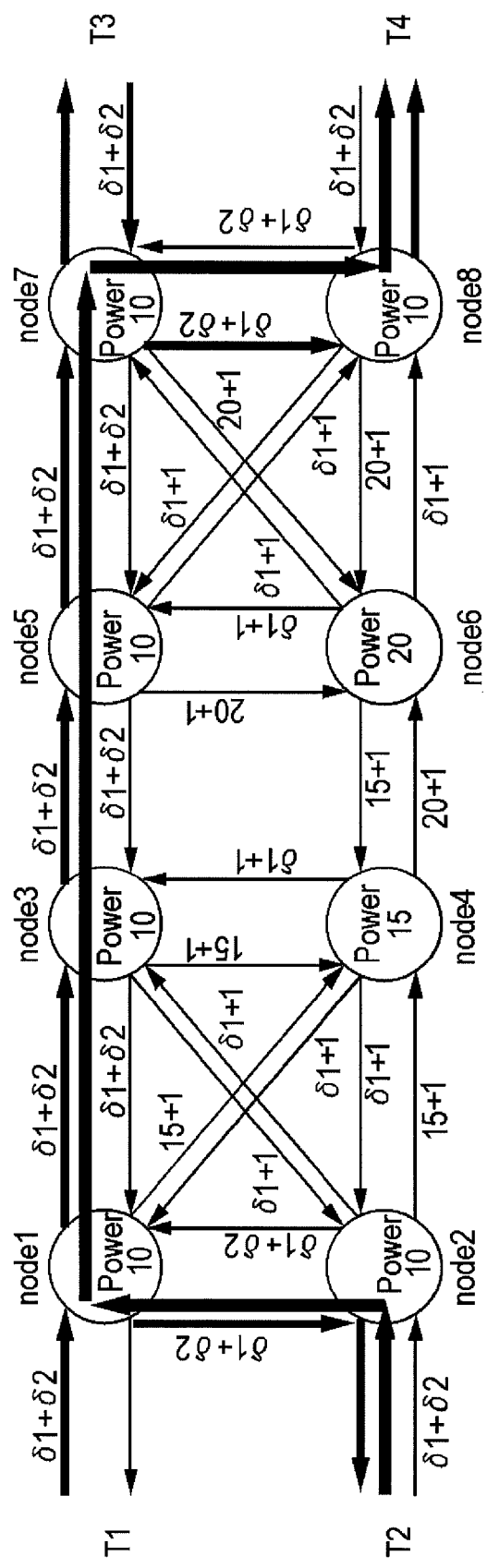
FIG. 26 is a diagram illustrating an example of a route of a data flow according to an embodiment of the present invention.

FIG. 25 illustrates an example of a network according to the present embodiment. In a situation in which a data flow from a terminal T1 to a terminal T3, a data flow from the terminal T1 to a terminal T2, and a data flow from the terminal T3 to a terminal T4 are set as illustrated in FIG. 25, the link costs of the respective links are as illustrated in FIG. 25. When a request for setting a data flow from the terminal T1 to the terminal T4 is made, the CPU 2 in the route determination process determines a route passing through node2, node1, node3, node5, node7, and node8 as the optimum route since the route has the smallest sum ((δ1+δ2)×6) of link costs. FIG. 26 illustrates an example of the route in which the data flow has been set. Since the physical resources of the links on the route are already utilized on other routes, so that it may be unnecessary to shift the status of the physical resource of a new link to the wake state and hence the power consumption of the entire network may not be increased so much.

A program in accordance with which any one of the above mentioned functions is implemented by computers, other machines, or other devices (hereinafter, referred to as computers) may be recorded in a non-transitory computer-readable recording medium. The computers may provide the function by reading the program from the recording medium and executing the program.

The non-transitory computer-readable recording medium is a recording medium that stores electrically, magnetically, optically, mechanically, or chemically information such as data and programs therein such that the information may be read out by the computers. The recording medium of the detachable type includes a flexible disk, a magneto-optical disk, a compact disc read-only memory (CD-ROM), a compact disc rewritable (CD-RW), a digital versatile disc (DVD), a Blu-ray Disc, a digital audio tape (DAT), an 8-mm tape, a memory card such as a flash memory. The recording medium of the fixed type includes a hard disk, a read only memory (ROM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A route control system to determine a route for a data flow in a network including a plurality of nodes and a plurality of links, each of the plurality of links connecting two nodes out of the plurality of nodes or connecting one of the plurality of nodes to one of a plurality of terminals, the route being a chain of links out of the plurality of links and connecting two terminals out of the plurality of terminals, the route control system comprising:
   a memory; and
   a processor executing:
      storing, in the memory, a link cost for each link included in the network;
      checking a status of a node included in the network, the status depending on whether a link is set to pass data through the node where the node is in a wake state when the link is set to pass data through the node and the node is in the sleep state when no link is set to pass data through the node,
      updating a link cost for a link connected with a node in the wake state to a value smaller than any link cost for a link connected with a node in the sleep state,
      accepting a flow request to set a data flow from a first terminal out of the plurality of terminals to a second terminal out of the plurality of terminals,
      determining an optimum route having a sum of link costs that is lowest among link costs for other available routes connecting the first terminal to the second terminal, and
      setting the data flow corresponding with the optimum route,
   wherein the updating stores in the memory, as the link cost for the link connected with the node in the sleep state, an amount corresponding to power consumption of the node in the sleep state and the updating updates the link cost for the link connected with a retired node to an amount corresponding to a power consumption of a retired node when the checking has detected that an active node has been shifted to the retired node after all data flows passing through the active node have completed, and
   wherein the active node is in the wake state, and the retired node is in the sleep state.

2. The route control system according to claim 1, wherein the storing stores a route determination policy in the memory defining a constraint condition for a route, and the determining determines the optimum route that meets the constraint condition.

3. A route control system to determine a route for a data flow in a network including a plurality of nodes and a plurality of links, each of the plurality of links connecting two nodes out of the plurality of nodes or connecting one of the plurality of nodes to one of a plurality of terminals, the route being a chain of links out of the plurality of links and connecting two terminals out of the plurality of terminals, the route control system comprising:
   a memory; and
   a processor executing:
      storing a link cost for each link included in the network,
      checking a status of each link included in the network, the status being a wake state or a sleep state, where a link which is set to pass data through a node in any existing data flow is in the wake state and a link which is not set to pass data through a node in an existing data flow is in the sleep state,
      updating a link cost for a link in the wake state to a value smaller than any link cost for a link in the sleep state,
      accepting a flow request to set a data flow from a first terminal out of the plurality of terminals to a second terminal out of the plurality of terminals,
      determining an optimum route having a sum of link costs that is lowest among link costs for other available routes connecting the first terminal to the second terminal, and
      setting the data flow corresponding with the optimum route,
   wherein the updating stores in the memory, as the link cost for the link in the sleep state, an amount larger than the link cost for the link in the wake state and the updating updates a link cost for a retired link to an amount larger than the link cost for the link in the wake state when the checking has detected that an active link has been shifted to the retired link after all data flows passing through the active link have completed, and
   wherein the active link is in the wake state, and the retired link is in the sleep state.

4. The route control system according to claim 3, wherein the storing stores a route determination policy defining a constraint condition for route, and the determining determines the optimum route that meets the constraint condition.

5. A route control method executed by a route control system to determine a route for a data flow in a network including a plurality of nodes and a plurality of links, each of the plurality of links connecting two nodes out of the plurality of nodes or connecting one of the plurality of nodes to one of a plurality of terminals, the route being a chain of links out of the plurality of links and connecting two terminals out of the plurality of terminals, the route control method comprising:
   checking a status of a node included in the network, the status depending on whether a link is set to pass data through the node where the node is in a wake state when the link is set to pass data through the node and the node is in the sleep state when no link is set to pass data through the node;

updating a link cost for a link connected with a node in the wake state to a value smaller than any link cost for a link connected with a node in the sleep state, the link cost for each link included in the network being stored in a memory;

accepting a flow request to set a data flow from a first terminal out of the plurality of terminals to a second terminal out of the plurality of terminals;

determining, by the route control system, an optimum route having a sum of link costs that is lowest among the link costs for other available routes connecting the first terminal to the second terminal; and setting the data flow corresponding with the optimum route, wherein the route control system stores, as the link cost for the link connected with the node in the sleep state, an amount corresponding to power consumption of the node in the sleep state and updates the link cost for a link connected with a retired node to an amount corresponding to a power consumption of the retired node when the route control system has detected that an active node has been shifted to the retired node after all data flows passing through the active node have completed, and wherein the active node is in the wake state, and the retired node is in the sleep state.

6. The route control method according to claim 5, wherein the route control system determines the optimum route that meets a constraint condition stored in the memory.

\* \* \* \* \*